(12) United States Patent
Richards (10) Patent No.: US 8,627,883 B2
(45) Date of Patent: Jan. 14, 2014

(54) DOWNHOLE LINEAR ACTUATION APPARATUS AND METHOD

(75) Inventor: Edward Richards, Witney (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 771 days.

(21) Appl. No.: 12/140,358

(22) Filed: Jun. 17, 2008

(65) Prior Publication Data

US 2009/0020293 A1    Jan. 22, 2009

(30) Foreign Application Priority Data

Jun. 26, 2007    (GB) .................................. 0712341.7

(51) Int. Cl.
     *E21B 34/00*      (2006.01)

(52) U.S. Cl.
     USPC ..... 166/66.7; 166/66.6; 166/332.1; 166/66.5; 137/870; 251/129.01

(58) Field of Classification Search
     USPC ................... 166/66.5, 66.6, 66.7, 332.1, 386; 137/870, 554; 251/129.01, 129.16
     See application file for complete search history.

(56) References Cited

U.S. PATENT DOCUMENTS

| | | | |
|---|---|---|---|
| 4,509,026 A * | 4/1985 | Matsushita | ...................... 335/85 |
| 4,574,843 A | 3/1986 | Loup et al. | |
| 4,687,054 A | 8/1987 | Russell et al. | |
| 4,928,028 A * | 5/1990 | Leibovich | ........................ 310/23 |
| 4,971,116 A * | 11/1990 | Suzuki et al. | ............ 137/625.65 |
| 5,236,047 A | 8/1993 | Pringle et al. | |
| 5,531,270 A | 7/1996 | Fletcher et al. | |
| 6,026,860 A * | 2/2000 | Teichmann | ................... 137/870 |
| 6,065,496 A | 5/2000 | Sanzenbacher et al. | |
| 6,089,332 A | 7/2000 | Barr et al. | |
| 6,116,354 A | 9/2000 | Buytaert | |
| 6,334,413 B1 | 1/2002 | Hattori et al. | |
| 6,819,208 B1 * | 11/2004 | Peghaire et al. | ............... 335/256 |
| 6,848,669 B2 * | 2/2005 | Makino | .................... 251/129.15 |
| 2005/0109542 A1 | 5/2005 | Downton | |
| 2005/0279415 A1 * | 12/2005 | Xu et al. | ..................... 137/627.5 |
| 2008/0023229 A1 * | 1/2008 | Richards et al. | ................. 175/74 |

FOREIGN PATENT DOCUMENTS

| | | |
|---|---|---|
| DE | 19646446 | 5/1998 |
| GB | 970551 | 9/1964 |
| GB | 1324456 | 7/1973 |

OTHER PUBLICATIONS

Office action for the equivalent Canadian patent application No. 2635816 issued on Jul. 3, 2012.

* cited by examiner

*Primary Examiner* — David Bagnell
*Assistant Examiner* — Elizabeth Gitlin
(74) *Attorney, Agent, or Firm* — Chadwick A. Sullivan; Brigitte Jeffery Echols (57) ABSTRACT

A linear actuation apparatus for controlling fluid flow comprises a tubular manifold for conducting fluid through a portion, and a shaft supported for reciprocal axial movement within the manifold. A valve seat is supported within the manifold in substantial alignment with the shaft, and a valve closure element is carried by the shaft for reciprocal axial movement between a closed and an opened position. A magnetic element is also carried by the shaft for reciprocal axial movement therewith. A pair of springs are carried on opposing sides of the magnetic element wherein one spring is compressed and applies an axial force to the shaft when the shaft is moved from a neutral position. A compound magnet, carried by the manifold, applies an axial force to the magnetic element that together with the axial force of the spring(s) and fluid pressure control movement of the shaft and the valve closure.

11 Claims, 6 Drawing Sheets

DOWNHOLE LINEAR ACTUATION APPARATUS AND METHOD

BACKGROUND OF THE INVENTION

1. Field of the Invention

The present invention relates to linear actuators, and more particularly to linear actuators that are capable of actuating a shaft in a downhole device between two or more stable, linear positions.

2. Background of the Related Art

Downhole operations conducted during the prospecting of hydrocarbons commonly require the need to move, switch, open or generally perform some type of low-force actuation. Such actuation is typically performed using solenoids that are selectively energized to accomplish the desired actuation. However, solenoids are only capable of energized movement in one direction. Consequently, solenoid movement is often opposed by a spring or another solenoid in order to move an actuator back to its original position following actuation by the first solenoid.

The use of an opposing spring is problematic in that the solenoid must compress the spring (i.e., overcome the spring force) to move the actuator from its original position, which requires more electrical energy than performing the actuation without the opposing spring force. Additionally, the solenoid must expend additional electrical energy to hold the actuator in the actuated position, until it is desired to permit the compressed spring to return the actuator to its original position. Actuators having a solenoid with an opposing spring are therefore inefficient from a power standpoint. Such inefficiency is amplified in a downhole application, because electrical power is expensive to generate and is often demanded by other downhole components as well.

The use of a second, opposing solenoid is also problematic in that the second solenoid requires its own coils and is typically configured in a collinear arrangement with the first solenoid. This results in an increased length and volume requirement within a downhole tool, which is expensive and often difficult to accommodate in a multi-functional tool.

The use of bistable actuators and linear motors for performing linear actuation is generally known, and such apparatuses have been employed to achieve linear actuation in downhole applications. Reference is made to the following U.S. Pat. Nos. 6,116,354 ("Rotary Steerable System for Use in Drilling Deviated Wells"); 5,531,270 ("Downhole Flow Control in Multiple Wells"); 5,236,047 ("Electrically Operated Well Completion Apparatus and Method"); 4,687,054 ("Linear Electric Motor for Downhole Use); as well as U.S. Patent Publication No. 2005/0109542 ("Steerable Drilling System"), each of which discloses the use of linear motors and/or bistable actuators for performing various linear actuation functions in downhole environments.

A shortcoming in existing linear motors and/or bistable actuators that are applied to downhole fluid flow control relates to the differential pressure across a flow control device such as a valve closure element. In particular, once a valve closure element is moved to a closed position, the differential pressure across the element may be relatively high, and tend to maintain the element in the closed position. This produces a situation where a relatively high linear actuation force is required to move the valve closure element from the closed position to an opened position. This need to overcome differential closing pressure therefore imposes a greater electrical energy demand on a downhole system than is needed, e.g., to simply perform linear actuation otherwise. The result is an inefficient consumption of electrical power.

A need therefore exists for an apparatus that achieves reliable linear actuation and operates under a minimum requirement of electrical power to move a valve closure element from its closed position. A need further exists for such an apparatus that is operable to achieve linear actuation between two or more stable linear positions.

SUMMARY OF THE INVENTION

The above-described needs, problems, and deficiencies in the art, as well as others, are addressed by the present invention in its various aspects and embodiments. In one aspect, the present invention provides an apparatus for controlling fluid flow in a wellbore penetrating subsurface strata. The inventive apparatus comprises a tubular manifold for conducting fluid through a portion thereof when disposed in the wellbore, and a shaft supported for reciprocal axial movement within the manifold. The shaft may comprise titanium. A bearing assembly may be carried by the manifold for supporting the shaft. A valve seat is supported within the manifold in substantial alignment with the shaft, and a valve closure element is carried by the shaft for reciprocal axial movement therewith between a closed position preventing fluid flow across the valve seat and an opened position permitting fluid flow across the valve seat. The valve seat and valve closure element may comprise a polycrystalline diamond compact (PDC) material. A magnetic element is also carried by the shaft for reciprocal axial movement therewith. A pair of springs are each carried on opposing sides of the magnetic element such that one of the springs is compressed by and applies an axial force to the shaft under the movement of the shaft from a neutral position. A compound magnet is carried by the manifold about the magnetic element for applying an axial force to the magnetic element that together with the axial force of the one spring and fluid pressure within the manifold control movement of the shaft and the valve closure element.

In particular embodiments, the tubular manifold comprises a pair of opposing valve seats supported within the manifold in substantial alignment with the shaft, and a pair of opposing valve closure elements carried by the shaft at or near opposing ends thereof for reciprocal axial movement therewith between positions preventing fluid flow across one of the opposing valve seats. Accordingly, the axial force applied by the compound magnet to the magnetic element together with the axial force of the one spring and fluid pressure within the manifold control movement of the shaft and the opposing valve closure elements.

More particularly, in such embodiments the tubular manifold may comprise a fluid inlet passageway and a pair of fluid outlet passageways, such that the opposing pair of valve seats define channels for fluid flow from the fluid inlet passageway to the respective pair of fluid outlet passageways, which may be parallel. In this manner, movement by the shaft of one of the valve closure elements to a position preventing fluid flow across one of the valve seats also moves the other valve closure element to a position permitting fluid flow across the other valve seat. A neutral shaft position may be defined such that movement by the shaft to the neutral position moves both valve closure elements to positions permitting fluid flow across the respective valve seats.

In particular embodiments, the inventive apparatus further comprises a first position sensor element carried by the shaft for movement therewith, and a second position sensor element carried by the manifold for detecting relevant movement of the first sensor element. The position sensor elements may comprise magnetostrictive elements.

In particular embodiments of the inventive apparatus, the magnetic element is carried by the shaft for reciprocal axial movement therewith in a sealed, oil-filled chamber within the manifold. The magnetic element may comprise one or more axial flow channels therethrough to facilitate axial movement of the magnetic element through the manifold chamber.

In particular embodiments of the inventive apparatus, each spring is carried on an opposing side of the magnetic element between a shoulder formed on the shaft and a shoulder formed on the compound magnet. Accordingly, each spring is compressed by and applies an axial force to the shaft under the movement of the shaft from the neutral position.

In particular embodiments of the inventive apparatus, the compound magnet comprises an electromagnet carried by the manifold about the shaft and having a conductive coil wound about spaced-apart magnetic core components, and a permanent magnet carried within the coil about a space between the magnetic core components. The magnetic element may be flange-like and protrude from the shaft for reciprocal axial movement within the space between the magnetic core components.

In another aspect, the present invention relates to a linear actuator, comprising a tubular housing, and a shaft supported for reciprocal axial movement within the housing between opposing positions. A magnetic element is carried by the shaft for reciprocal axial movement therewith. A pair of springs are each carried on opposing sides of the magnetic element such that one of the springs is compressed by and applies an axial force to the shaft under the movement of the shaft from a neutral position. A compound magnet is carried by the housing about the magnetic element for applying an axial force to the magnetic element that together with the axial force of the one spring control movement of the shaft.

In particular embodiments of the inventive actuator, the housing is adapted for conducting fluid through a portion thereof when disposed in a wellbore. A pair of opposing valve seats may be supported within the housing in substantial alignment with the shaft, and a pair of valve closure elements may be carried by the shaft at or near opposing ends thereof for reciprocal axial movement with the shaft between positions preventing fluid flow across one of the opposing valve seats.

In a further aspect, the present invention relates to a method for actuating a shaft supported for reciprocal axial movement between opposing positions within a housing. The inventive method comprises the steps of equipping the shaft with a magnetic element, adjustably applying a axial magnetic force to the magnetic element, and applying an opposing spring force to the shaft when it's moved from a neutral position in either direction.

The adjustably applying step may comprise adjusting the direction of the magnetic force, adjusting the magnitude of the magnetic force, or a combination thereof. More particularly, the adjustably applying step may comprise equipping the shaft with an electromagnet and a permanent magnet, and selectively: transmitting electrical current to the electromagnet in one direction, transmitting electrical current to the electromagnet in an opposing direction, or withholding electrical current from the electromagnet.

In particular embodiments of the inventive method, the housing is adapted for conducting fluid through a portion thereof when disposed in a wellbore, and the housing supports a pair of opposing valve seats therein in substantial alignment with the shaft. The shaft may be equipped with a pair of valve closure elements at or near opposing ends thereof for reciprocal axial movement with the shaft between positions preventing fluid flow across one of the opposing valve seats.

BRIEF DESCRIPTION OF THE DRAWINGS

A more particular description of the invention, briefly summarized above, is provided by reference to embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
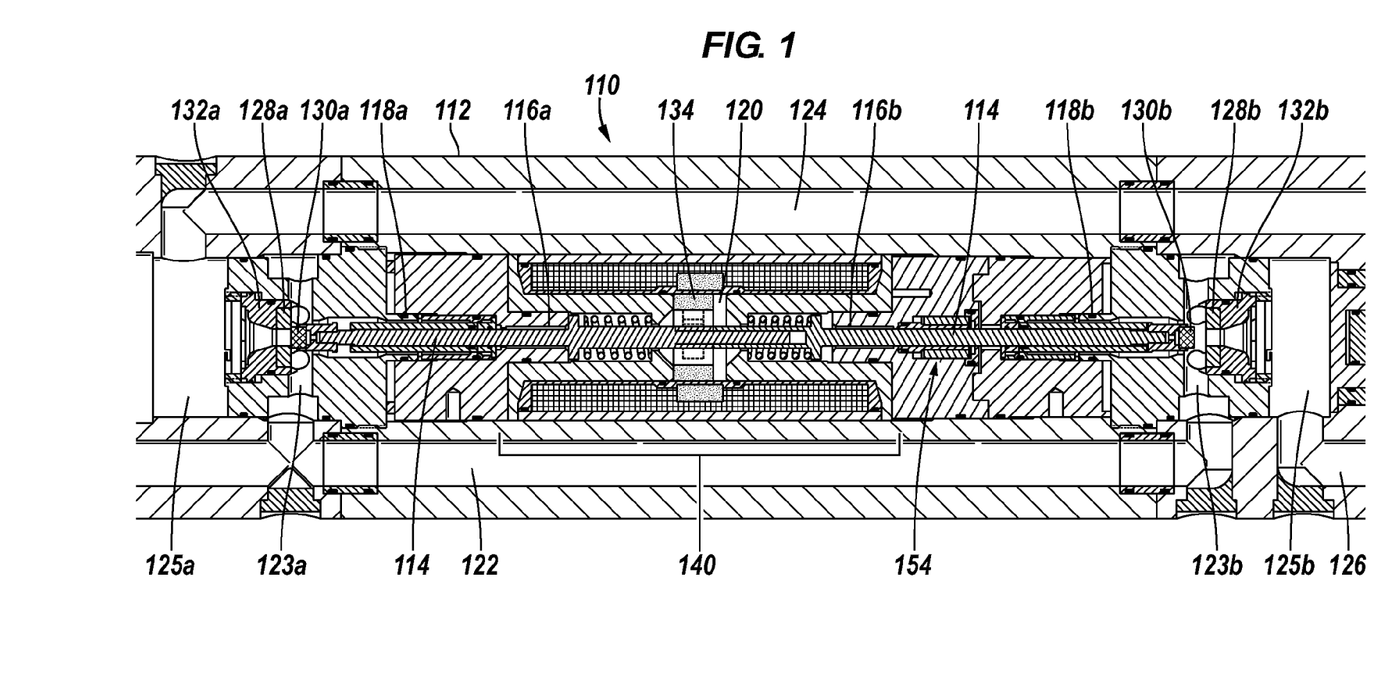
FIG. 1 is an axial sectional view of an apparatus employing opposing valve assemblies for controlling fluid flow in a manifold adapted for downhole use according to the present invention.

FIG. 1 is an axial sectional view of an apparatus 110 employing opposing valve assemblies for controlling fluid flow in a wellbore (not shown) according to the present invention. The apparatus 110 comprises a tubular manifold 112 for conducting high-pressure fluid, such as drilling mud, through portions thereof when disposed in the wellbore. The manifold 112 is adapted for connection within a drilling string (not shown) so as to selectively deliver pressurized fluid for use in one or more downhole applications. Particular applications with which the manifold may employed include the selective energization of peripheral actuators of the type used in push-the-bit type rotary steerable drilling systems (RSS), like the RSS described in U.S. Pat. No. 6,089,332.

A shaft 114 is supported for reciprocal axial movement within the manifold 112, as will be further described below. The shaft 114 preferably comprises titanium, which provides suitable load-bearing characteristics with reduced weight and inertia effects as compared with conventional steels, thereby mitigating the impact of drilling-induced shock on the shaft 114 and the apparatus 110. A bearing assembly comprising elongated bearings 116a, 116b are carried by the manifold 112 for supporting and guiding the shaft 114.

Flexible shaft seals 118a, 115b are employed for isolating a compensated oil-filled chamber 120 within the manifold 112 from a fluid inlet passageway 122 therein that is open to the wellbore environment, and thus typically filled with drilling mud. Pressure compensators (not shown) equalize the manifold chamber's oil pressure with that of the drilling mud in the manifold passageway 122. The flexible shaft seals 118a, 118b may comprise rubber, a metal bellows, or other suitable means as are known to those having ordinary skill in the art. The flexible shaft seals can also be replaced by conventional dynamic seals.

A pair of opposing valve seats 128a, 128b are supported within the manifold 112 in substantial alignment with the shaft 114. Complementing valve closure elements, or plungers 130a, 130b are carried by the shaft 114 at opposing ends thereof for reciprocal axial movement therewith between a closed position (see, e.g., right-side plunger 130b in FIG. 3) preventing fluid flow across its respective valve seat and an opened position (see, e.g., left-side plunger 130a in FIG. 3) permitting fluid flow across its respective valve seat. The valve seats 128a, 128b and valve closure elements 130a, 130b may comprise a polycrystalline diamond compact (PDC) material for withstanding erosion under the flow of erosive fluids, such as drilling mud, thereacross. The valve closure elements are each equipped with seat depth adjusters 132a, 132b for moving the valve seats 128a, 128b towards or away from the valve plungers 130a, 130b. This allows the plungers 130a, 130b to be "floated" in respective closed positions so that the plungers properly seat when closed, but apply minimal impact to the valve seats 128a, 128b upon closing.

The tubular manifold 112 further comprises a pair of fluid outlet passageways 124, 126 for receiving fluid from the fluid inlet passageway 122. The passageways are parallel to one another and are configured with shorter, substantially perpendicular passageways 123a, 123b and 125a, 125b such that the opposing pair of valve seats 128a, 128b defines gates or channels for high-pressure fluid—such as drilling mud being circulated through a drill string (not shown) containing the apparatus 110—to selectively flow from the fluid inlet passageway 122 to the respective pair of fluid outlet passageways 124, 126 (see fluid flow arrows in FIGS. 3-5).

Figure 3:
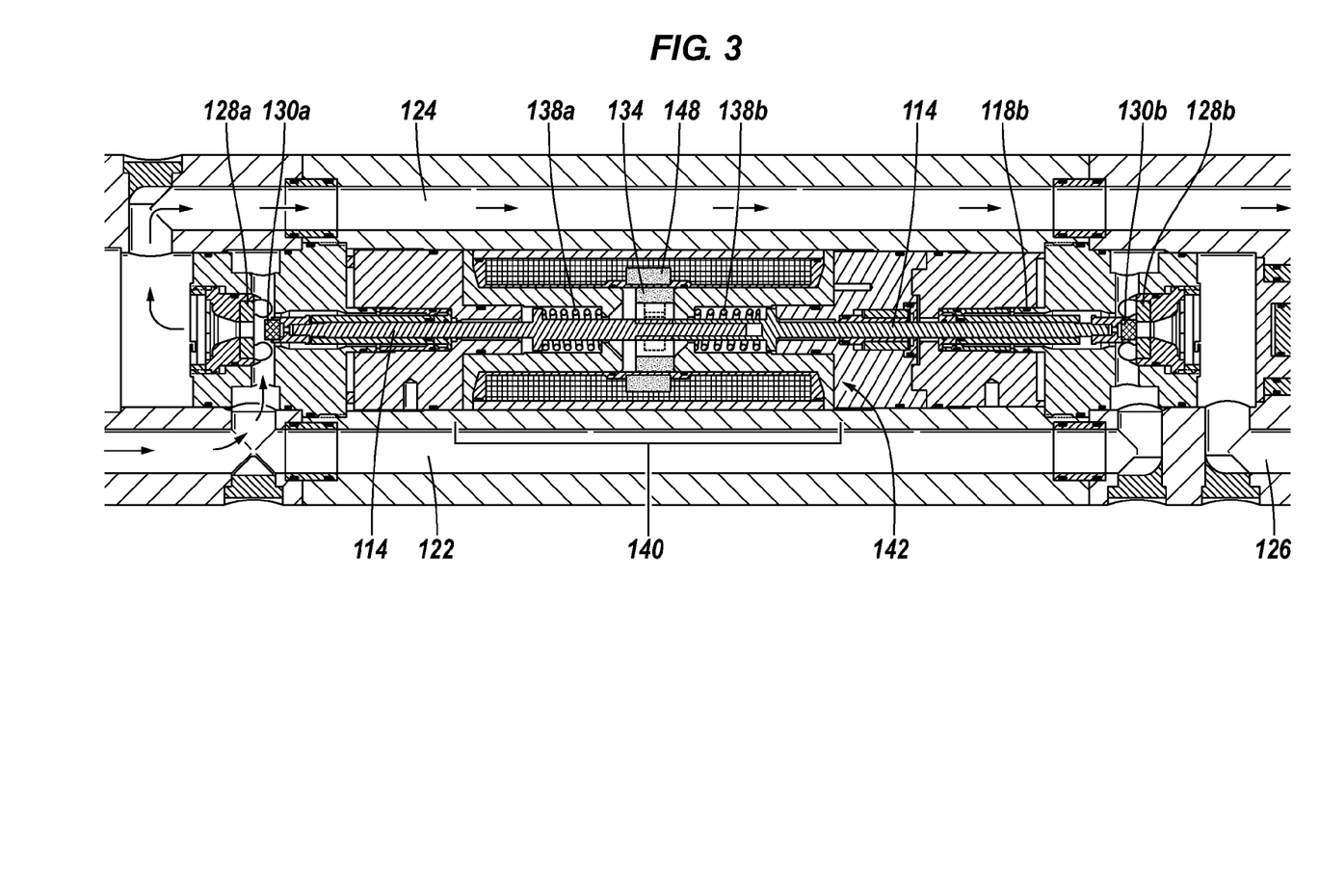
FIG. 3 is an axial section wherein the shaft of the inventive apparatus has been actuated to a position opening the left valve assembly and closing the right valve assembly.
Figure 4:
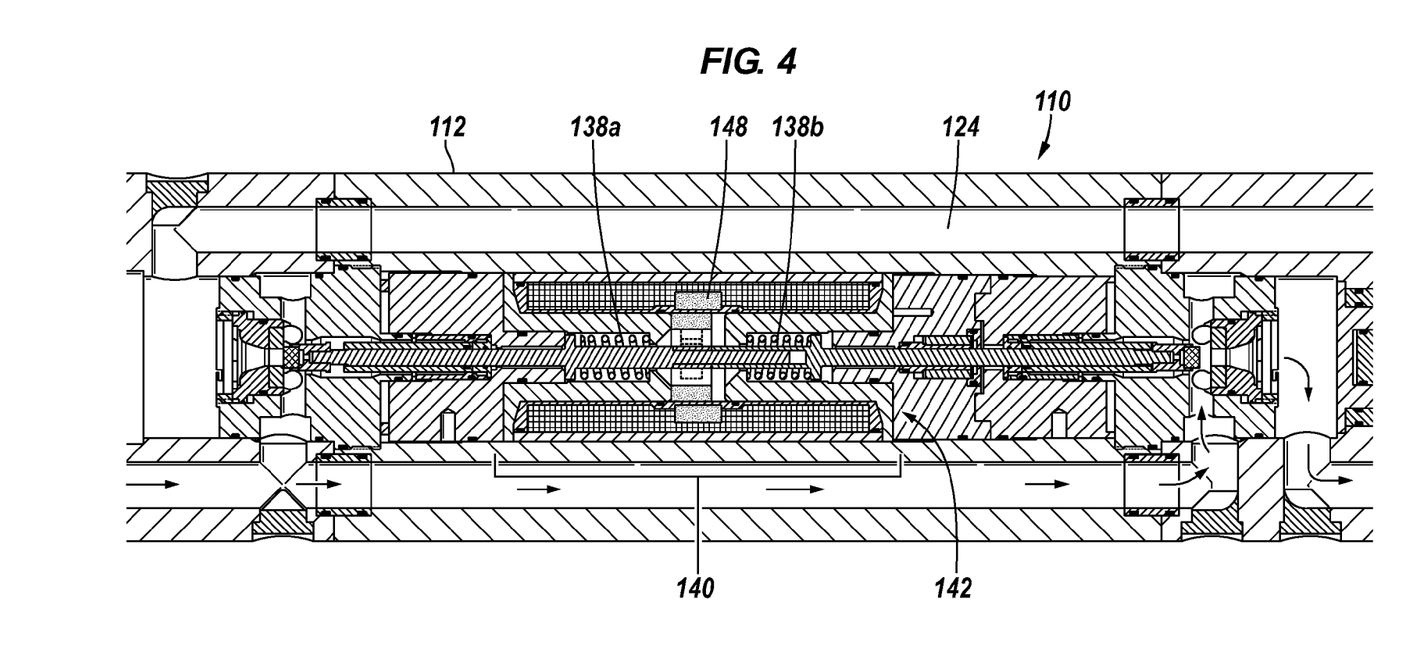
FIG. 4 is an axial section wherein the shaft of the inventive apparatus has been actuated to a position opening the right valve assembly and closing the left valve assembly.

FIGS. 3-4 illustrate sequential, reciprocal movement by the shaft 114 of one of the valve closure elements to a position preventing fluid flow across one of the valve seats (see, e.g., right-side plunger 130b in FIG. 3, and left-side plunger 130a in FIG. 4) while the other valve closure element is moved to a position permitting fluid flow across the other valve seat (see left-side plunger 130a in FIG. 3, and right-side plunger 130b in FIG. 4). A neutral shaft position may also be defined such that movement by the shaft 114 to the neutral position moves both valve closure elements 130a, 130b to positions permitting fluid flow across the respective valve seats 128a, 128b (see FIG. 5).

A magnetically-permeable element 134 is also carried by the shaft 114 for reciprocal axial movement therewith in the compensated, oil-filled chamber 120 within the manifold 112. The magnetic element 134 may comprise one or more axial flow channels 136 (see FIG. 2) therethrough to facilitate free axial movement of the magnetic element through the oil in the manifold chamber 120. The flow channels 136 also reduce the weight and therefore the inertia of the magnetic element 134, to mitigate the effect of longitudinal drilling shocks. The magnetic element 134 is flange-like and protrudes from the shaft 114 for reciprocal axial movement within a space 150, which defines a portion of the chamber 120.

Figure 2:
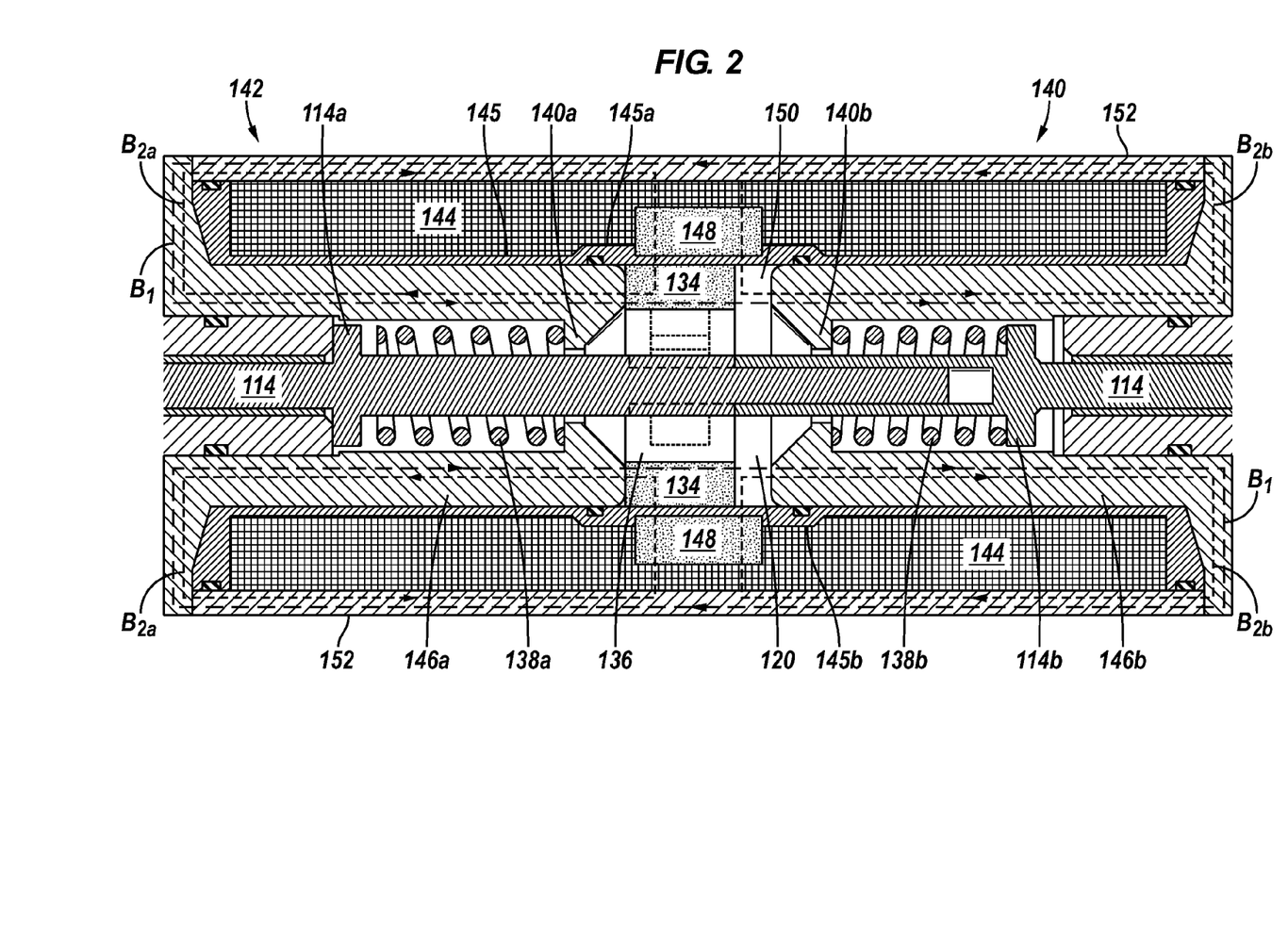
FIG. 2 is a detailed axial section of a compound magnet and spring assembly employed by the inventive apparatus for actuating linear movement of a shaft to selectively open or close opposing valve assemblies.

A pair of helical springs 138a, 138b are each carried on opposing sides of the magnetic element 134 such that one of the springs is compressed by and applies an axial force to the shaft 114 under the movement of the shaft from a neutral position. The springs 138a, 138b are used to balance the magnetic forces (described below) applied to the magnetic element 134. Each spring 138a, 138b is carried on an opposing side of the magnetic element 134 between one of the shoulders 114a, 114b formed on the shaft and one of the shoulders 140a, 140b formed on a compound magnet 140 (described below). Accordingly, each spring 138a, 138b is compressed by and applies an axial force to the shaft 114 under the movement of the shaft from the neutral position.

The compound magnet, generally referred to as 140, is carried by the manifold 112 about the magnetic element 134 for applying an axial magnetic force to the magnetic element that together with the axial force of the compressed spring(s) and fluid pressure within the manifold—particularly fluid pressure across the valve plungers 130a, 130b-control movement of the shaft 114 and the valve plungers 130a, 130b. FIG. 2 displays the compound magnet 140 in greater detail, and illustrates typical magnetic field lines $B_1$, $B_{2a}$, and $B_{2b}$ that are induced by the compound magnet 140.

The compound magnet 140 comprises an electromagnet 142 carried by the manifold 112 about the shaft 114. The electromagnet 142 includes a conductive coil 144 wound about a nonmagnetically-permeable bobbin 145, which in turn is configured about spaced-apart magnetically-permeable core, or stator components 146a, 146b. The coil is energized by electrical current from wires (not shown) passing through a portion of the manifold 112 so as to produce a magnetic field $B_1$ that urges the magnetic element 134 to move axially through the space 150 from one of the stator components to the other. The coil 144 is encased within a magnetically-permeable stator casing 152.

Still referring to FIG. 2, the compound magnet 140 further comprises a permanent magnet 148 carried within the coil 144 about the bobbin 145, within flanged portions 145a, 145b thereof. The permanent magnet 148 is generally configured in a toroidal shape about the space 150 between the magnetic core/stator components 146a, 146b. The magnet may comprise a high temperature annulus-type magnet that is magnetized radially towards its center, as is known to those having ordinary skill in the art.

Accordingly, the stator components 146a, 146b, the stator casing 152, and the movable magnetic element 134 constitute a magnetic circuit through which magnetic fields $B_1$ and $B_{2a}$, $B_{2b}$ are induced. The magnetic fields $B_{2a}$, $B_{2b}$ are induced by the permanent magnet 148, and are therefore substantially constant and do not change direction. The magnetic field $B_1$ is induced by the electromagnet 142, and its magnitude and direction will depend on the magnitude and direction of electrical current applied through the windings of the coil 144. Accordingly, the magnetic element 134 will be drawn towards one stator component (146a or 146b) or the other depending upon the direction of the applied current. However, when no current is applied to the coil 144, the magnetic element 134 will move towards the nearest stator component under the influence of the permanent magnet 148. As mentioned above, the springs 138a, 138b are used to balance the induced magnetic forces. As a result, the axial force applied by the compound magnet 140 to the magnetic element 134 together with the axial force of the compressed spring(s), along with the manifold fluid pressure across the valve plungers 130a, 130b (see FIG. 1), will collectively control movement of the shaft 114 and the opposing valve plungers 130a, 130b.

With reference again to FIG. 1, the apparatus 110 may further comprise a first position sensor element (not shown) carried by the shaft 114 for movement therewith, and a second position sensor element 154 carried by the manifold 112 for detecting relevant movement of the first sensor element. The position sensor elements are useful for tracking the movement of the shaft 114, and therefore the positions of the valve plungers 130a, 130b, and may comprise magnetostrictive elements. Accordingly, the first position sensor element may comprise a magnetically permeable steel element (not shown) welded to the titanium shaft, and the second sensor element may comprise a small wire coil 154 that measures the relative displacement of the steel element.

Figure 6:
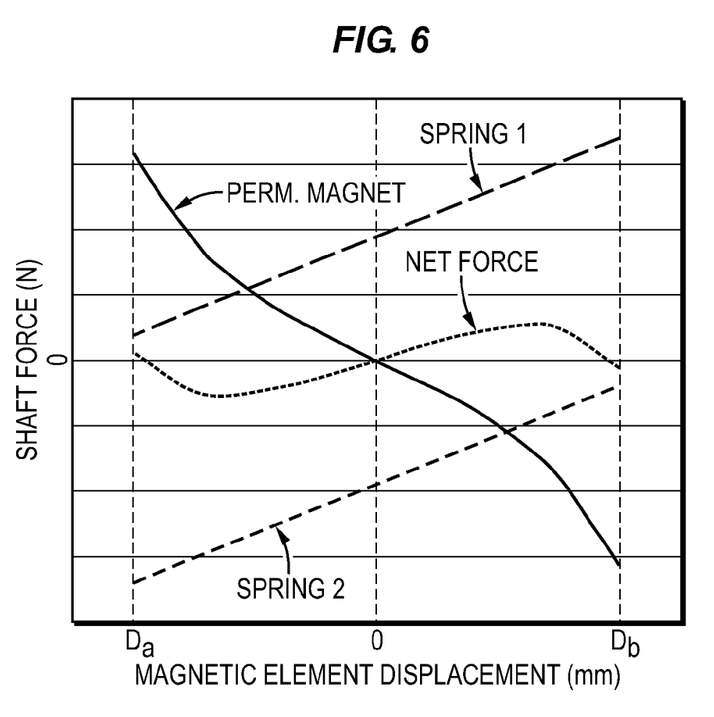
FIG. 6 is a plot of the actuating forces applied to the shaft by the compound magnet and spring assembly shown in FIG. 2.

Turning now to FIG. 6, a plot of the actuating forces applied to the shaft 114 of the inventive apparatus 110 is presented. The shaft forces are plotted as a function of the shaft displacement, or more particularly the displacement of magnetic element 134 between the limits of the space 150 as defined by the inner sides of the stator components 146*a*, 146*b*. These displacement limits are indicated, respectively, as $D_a$ and $D_b$ in FIG. 6.

The plotted line denoted by circles in FIG. 6 shows the magnetic force applied to the shaft 114 by the compound magnet 140 when no current is applied to the coil 144 (i.e., the force resulting solely from the permanent magnet 148). It can be seen that this applied permanent-magnet force increases as the magnetic element 134 approaches either of the limits $D_a$, $D_b$ defined by the stator components 146*a*, 146*b*. The applied permanent-magnet force is zero when the magnetic element 134 is positioned at a middle location between the two stator components.

The plotted lines denoted by triangles and squares in FIG. 6 show the forces that the two helical springs 133*a*, 138*b* exert on the shaft 114 when the springs are compressed by the shaft shoulders 114*a*, 114*b* as the shaft-carried magnetic element 134 moves from the middle, neutral location toward one of the stator components 146*a*, 146*b*. The springs may be preloaded to some degree (as is indicated in FIG. 6) so that apply equal, opposing compressive forces to the shaft 114 when the magnetic element 134 is in its neutral position. Thus, as the magnetic element 134 moves in a direction that causes one spring to undergo increased compression, the other spring will undergo proportionately decreased compression.

Figure 5:
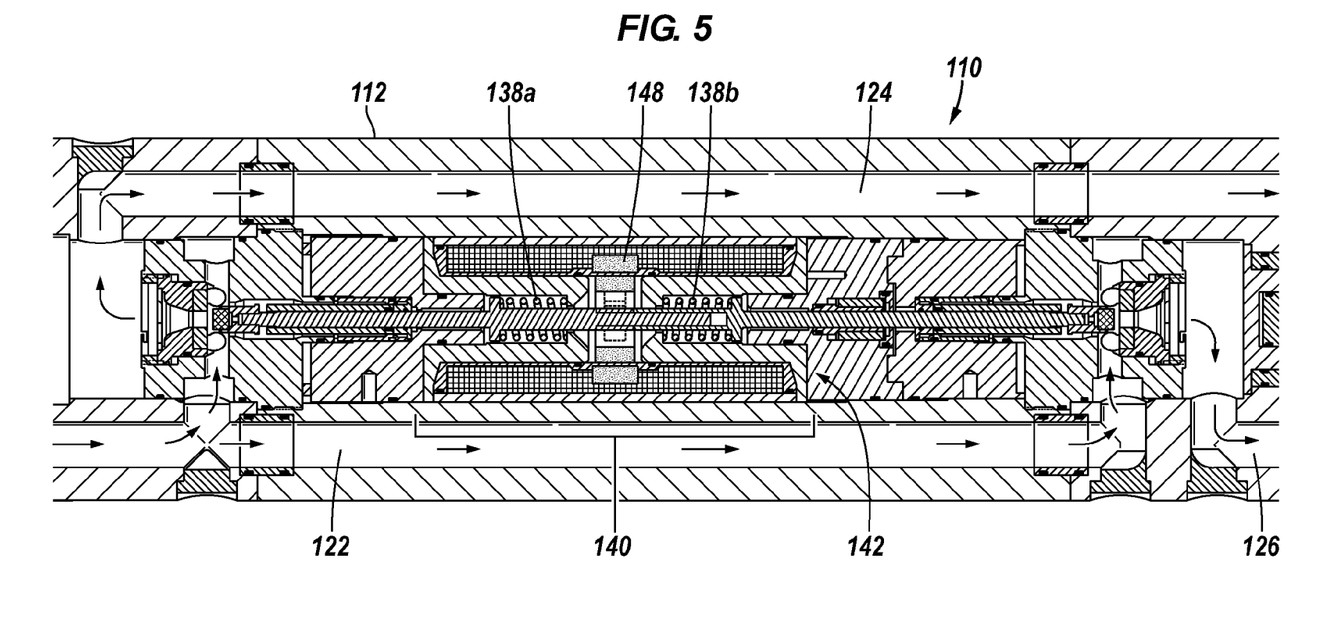
FIG. 5 is an axial section wherein the shaft of the inventive apparatus has been actuated to a neutral position opening both left valve assembly and the right valve assembly simultaneously.

The plotted line denoted by diamonds in FIG. 6 shows the net force experienced by the shaft 114 when the spring forces are added to that of the magnet. The net force line shows how the springs may be tuned with the compound magnet 140 so that the two nearly counteract each other. Accordingly, the addition of the opposing springs 138*a*, 138*b* to the compound magnet 140 produces the possibility of a third, stable position for the magnetic element 134 and the shaft 114. Thus, with reference to the opposing valve plungers 130*a/b*, FIGS. 3 and 4 show two stable open/closed valve positions while FIG. 5 shows a stable open/open valve position.

Once the valve plungers 130*a*, 130*b* are respectively moved to a closed position, the hydraulic pressure acting across the closed valve plunger holds it closed (like a plug in a drain hole). This resulting differential pressure induces a force that temporarily locks or latches the valve in the closed position.

The apparatus 110 as described herein is not truly bi-stable, because the movement of a valve plunger from a closed position does not necessarily "snap" the opposing valve plunger to a closed position. Such a bi-stable snapping effect is a consequence of the force required to open the (closed) valve plunger being much larger than that required to otherwise move the shaft 114. Accordingly, once the hydraulic latching force has been overcome and the valve plunger is opened, the force/energy applied by the compound magnet 140 and springs 138*a*, 138*b* is instantaneously transferred into accelerating the shaft 114 to urge the other valve plunger towards a closed position. This closing movement, however, is regulated in the apparatus 110 by the employment of the opposing springs 138*a*, 138*b*, influencing what would otherwise be bi-stable actuation between opposing hydraulically-latched states.

The hydraulic latching force can be tuned by varying the spring constants and/or by varying the valve plunger and seat diameters, since the applied hydraulic force is primarily a function of the valve area and the fluid pressure applied. Increasing the spring constant of the springs 138*a*, 138*b* will oppose the latching force that the differential pressure provides, but tends to make the shaft 114 more susceptible to longitudinal, drilling-induced shock. This tendency is mitigated, however, by reducing the mass of the moving components (e.g., by employing the flow channel 136 in the magnetic element 134, and by selecting titanium for the shaft 114, as are described above). Reducing the latching force to a minimum is important as it reduces further the force required to open the valve and hence reduces the operating power. The addition of the springs 138*a*, 138*b* that are properly tuned with the compound magnet 140 and the hydraulic latching force across the respective valve plungers 130*a*, 130*b* thus provides a definite tristable state.

As described herein, the present invention is well adapted for actuating a shaft 114 supported for reciprocal axial movement between opposing positions within a housing such as a mandrel 112. An axial magnetic force is adjustably applied to a magnetic element 134 carried by the shaft, and an opposing spring force is applied to the shaft when it's moved from a neutral position in either direction. The adjustably applying step may comprise adjusting the direction of the magnetic force, adjusting the magnitude of the magnetic force, or a combination thereof. More particularly, the adjustably applying step may comprise equipping the shaft 114 with an electromagnet 142 and a permanent magnet 148, and selectively: (a) transmitting electrical current to the electromagnet 142 in one direction to achieve the shaft placement of FIG. 3 (a first stable state) permitting fluid to flow from the inlet passageway 122 to the outlet passageway 124; (b) transmitting electrical current to the electromagnet 142 in an opposing direction to achieve the shaft placement of FIG. 4 (a second stable state) permitting fluid to flow from the inlet passageway 122 to the outlet passageway 126; or (c) withholding electrical current from the electromagnet 142, which—depending on the timing—will result in either the maintenance of the respective first or second stable states, or the placement of the shaft 114 at the neutral position of FIG. 5 (a third stable state) permitting fluid to flow from the inlet passageway 122 to both outlet passageways 124, 126.

It will be further appreciated by those having ordinary skill in the art that the present invention may be employed to advantage in at least the following ways:

1) achieving low power, high speed fluid control actuation downhole;
2) usable in a drill string "while drilling;"
3) usable in erosive fluid environments downhole;
4) usable in high pressure fluid environments downhole;
5) usable to control fluid flow rate downhole; and
6) requires no electrical zero power to maintain any of three stable states.

It will be understood from the foregoing description that various modifications and changes may be made in the preferred and alternative embodiments of the present invention without departing from its true spirit. For example, while the use of the present invention for fluid flow control in a RSS is expressly mentioned above, the invention is not so limited in its application. Additionally, while certain components of the present invention are described herein as being operable in particular states (e.g., springs 138*a*, 138*b* being preloaded in the neutral position), the invention is not necessarily characterized by such states and may admit to other operating states (e.g., springs unloaded in neutral position).

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open set or group. Similarly, the terms "containing," having," and "including" are all intended to mean an open set or group of elements. "A," "an" and other singular terms are intended to include the plural forms thereof unless specifically excluded. It is the express intention of the applicant not to invoke 35 U.S.C. §112, paragraph 6 for any limitations of any of the claims herein, except for those in which the claim expressly uses the words "means for" together with an associated function.

What is claimed is:

1. An apparatus for controlling fluid flow in a wellbore penetrating subsurface strata, comprising:
    a tubular manifold for conducting fluid through a portion thereof when disposed in the wellbore;
    a shaft supported for reciprocal axial movement within the manifold;
    a pair of opposing valve seats supported within the manifold in substantial alignment with the shaft;
    a pair of opposing valve closure elements carried by the shaft for reciprocal axial movement therewith between positions preventing fluid flow across one of the valve seats;
    a fluid inlet passageway;
    a pair of fluid outlet passageways;
    the opposing pair of valve seats defining channels for fluid flow from the fluid inlet passageway to the respective pair of fluid outlet passageways; wherein movement by the shaft of one of the valve closure elements to a position preventing fluid flow across one of the valve seats also moves the other valve closure element to a position permitting fluid flow across the other valve seat;
    a magnetic element carried by the shaft for reciprocal axial movement therewith between a pair of stator elements;
    a pair of springs each carried on opposing sides of the magnetic element such that one of the springs is compressed by and applies an axial force to the shaft under the movement of the shaft from a neutral position; and
    a compound magnet carried by the manifold about the magnetic element for applying an axial force to the magnetic element that together with the axial force of the one spring and fluid pressure within the manifold control movement of the shaft and the valve closure elements, the compound magnet comprising an electromagnet and a permanent magnet in which the electromagnet may be selectively energized to initiate movement of the shaft, and the permanent magnet is employed to hold the magnetic element proximate either of the stator elements when no current is applied to the electromagnet.

2. The apparatus of claim 1, wherein movement by the shaft to the neutral position moves both valve closure elements to positions permitting fluid flow across the respective valve seats.

3. The apparatus of claim 1, wherein the pair of fluid outlet passageways are parallel.

4. The apparatus of claim 1, further comprising a bearing assembly carried by the manifold for supporting the shaft.

5. The apparatus of claim 1, wherein the valve seat and valve closure element comprise a polycrystalline diamond compact (PDC) material.

6. The apparatus of claim 1, wherein the shaft comprises titanium.

7. The apparatus of claim 1, further comprising:
    a first position sensor element carried by the shaft for movement therewith; and
    a second position sensor element carried by the manifold for detecting relevant movement of the first sensor element.

8. The apparatus of claim 7, wherein the position sensor elements comprise magnetostrictive elements.

9. The apparatus of claim 1, wherein the magnetic element is carried by the shaft for reciprocal axial movement therewith in a sealed, oil-filled chamber within the manifold, and the magnetic element comprises one or more axial flow channels therethrough to facilitate axial movement of the magnetic element through the manifold chamber.

10. The apparatus of claim 1, wherein each spring is carried on an opposing side of the magnetic element between a shoulder formed on the shaft and a shoulder formed on the compound magnet, whereby each spring is compressed by and applies an axial force to the shaft under the movement of the shaft from the neutral position.

11. The apparatus of claim 1, wherein the compound magnet comprises:
    the electromagnet carried by the manifold about the shaft and having a conductive coil wound about spaced-apart magnetic core components; and
    the permanent magnet carried within the coil about a space between the magnetic core components;
    the magnetic element being flange-like and protruding from the shaft for reciprocal axial movement within the space between the magnetic core components.

* * * * *